Patented May 23, 1933

1,910,462

UNITED STATES PATENT OFFICE

ARNOLD BRUNNER AND HEINRICH GREUNE, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

ω-HALOGEN-METHYL DERIVATIVES OF AROMATIC HYDROCARBONS AND PROCESS OF PREPARING THE SAME

No Drawing. Application filed April 28, 1930, Serial No. 448,174, and in Germany May 8, 1929.

The present invention relates to new ω-halogen-methyl-derivatives of aromatic hydrocarbons.

Another object of our invention is a process of preparing ω-halogen-methyl-derivatives of aromatic hydrocarbons.

More particularly our invention relates to the new compounds of the general formula:

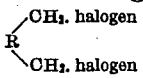

wherein R represents an aromatic polynuclear hydrocarbon radical, such as a naphthalene, an acenaphthene or an anthracene radical.

Our new process of preparing ω-halogenmethyl derivatives of aromatic hydrocarbons comprises the treatment of the aromatic hydrocarbon with an aqueous solution of formaldehyde, which is saturated with hydrogen halide, in such a quantity that at least two molecules of formaldehyde are acting on one molecule of the hydrocarbon. In our new process it is not necessary to use a condensing agent as for instance zinc chloride. Preferably we carry out the reaction by heating the reaction mixture to an elevated temperature as for instance to the boiling point of the reaction mixture.

Our new compounds are valuable intermediate products for the manufacture of dyestuffs. They are also intended as starting materials for preparing new tanning agents or new products to be used in dyeing processes.

The following examples illustrate the invention, but they are not intended to limit it thereto, the parts being by weight:

1. 90 parts of naphthalene are suspended in a mixture of 300 parts of an aqueous solution of formaldehyde of 30 per cent strength and 200 parts of concentrated hydrochloric acid. The mixture is then heated to boiling on the reflux apparatus while stirring and a current of gaseous hydrochloric acid is introduced for about 12 hours. After cooling, the solid product is separated from the mother liquor and washed with water. (By compensating the formaldehyde used up by p-formaldehyde, the mother liquor may be used again for preparing another mixture.) When the product is dried in a vacuum, it represents a solid, in some cases a somewhat oily mass, whose weight on account of the enlargement of the molecule is considerably higher than that of the naphthalene used. The product thus obtainable represents a mixture of a naphthalene derivative containing chloromethyl groups and its contents in chlorine varies generally between 21–26 per cent.

The crude product thus obtainable is purified by dissolving it in about 200 parts of boiling acetone and, after cooling the insoluble crystalline residue is filtered by suction. The residue is easily soluble in hot alcohol, benzene, acetone and petroleum ether, but difficultly soluble in ether. It melts at about 130° C.–140° C. As the analysis shows, it represents a di-(ω-chloromethyl)-naphthalene having the following formula:

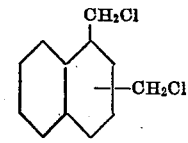

2. Gaseous hydrochloric acid is introduced into a suspension of 178 parts of finely dispersed anthracene in about 2000 parts of hydrochloric acid and 800 parts of an aqueous solution of formaldehyde of 35 per cent strength while stirring and heating on the reflux apparatus to an elevated temperature for some hours.

The intensely yellow colored product thus obtainable is filtered by suction, washed and dried. It represents an anthracene derivative containing chloromethyl groups and is a valuable starting material which can be used for various purposes.

In a similar manner there may be introduced by means of an aqueous solution of formaldehyde and hydrochloric acid chloromethyl groups into other pure or crude polynuclear hydrocarbons as, for instance, acenaphthene, phenanthrene and the like.

3. 132 parts of tetralene are heated on the reflux apparatus for 8 hours to 65° C. and subsequently for 30 hours to 90° C. together with 350 parts of formaldehyde of 30 per cent strength and 1000 parts of concentrated hydrochloric acid while introducing gaseous hydrochloric acid. The oil thus obtainable is separated from the mother liquor; on standing, it solidifies to a crystalline paste. After recrystallization from hexahydrobenzene the crystals melt at 117.5 C. and have most probably the following formula:

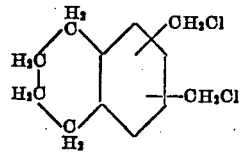

We claim:

1. As new products, aromatic-polynuclear hydrocarbon compounds containing two halogen-methyl substituents in the nucleus, of the following schematic formula:

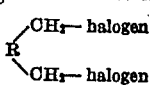

wherein R represents a radical of an aromatic polynuclear hydrocarbon, which compounds are obtainable by a process which comprises reacting with an aqueous solution of formaldehyde which is saturated with a hydrogen halide upon an aromatic polynuclear hydrocarbon in such a quantity that at least two molecules of formaldehyde are acting on one molecule of the hydrocarbon.

2. As new products, aromatic polynuclear hydrocarbon compounds containing two chloro-methyl substituents in the nucleus, of the schematic formula:

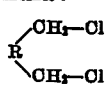

wherein R represents a radical of an aromatic hydrocarbon of the group consisting of the naphthalene, acenaphthene and anthracene series, which compounds are obtainable by a process which comprises reacting with an aqueous solution of formaldehyde which is saturated with hydrogen chloride upon an aromatic hydrocarbon of the group consisting of the naphthalene, acenaphthene and anthracene series in such a quantity that at least two molecules of formaldehyde are acting on one molecule of the hydrocarbon.

3. As a new product di-($\omega$-chloro-methyl)-naphthalene having a melting point between 130° C.–140° C., being easily soluble in warm alcohol, benzene, acetone and petroleum ether, but being difficultly soluble in ether.

4. The process which comprises reacting with an aqueous solution of formaldehyde which is saturated with a hydrogen halide upon a polynuclear aromatic hydrocarbon in such a quantity that at least two molecules of formaldehyde are acting on one molecule of the hydrocarbon.

5. The process which comprises reacting with an aqueous solution of formaldehyde which is saturated with hydrogen chloride upon an aromatic polynuclear hydrocarbon in such a quantity that at least two molecules of formaldehyde are acting on one molecule of the hydrocarbon.

6. The process which comprises reacting with an aqueous solution of formaldehyde which is saturated with hydrogen chloride upon naphthalene in such a quantity that at least two molecules of formaldehyde are acting on one molcule of naphthalene.

7. The process which comprises suspending one molecule of naphthalene in an aqueous solution of formaldehyde of about 30 per cent strength which solution contains at least two molecules of formaldehyde and hydrochloric acid and introducing into the reaction mixture gaseous hydrochloric acid while heating the reaction mixture to boiling.

In testimony whereof, we affix our signatures.

ARNOLD BRUNNER.
HEINRICH GREUNE.